Oct. 11, 1966

A. G. TUCCI 3,277,853

FABRIC-SHAPING DEVICES

Filed Sept. 24, 1965

INVENTOR.
Anthony G. Tucci

BY

ATTORNEY

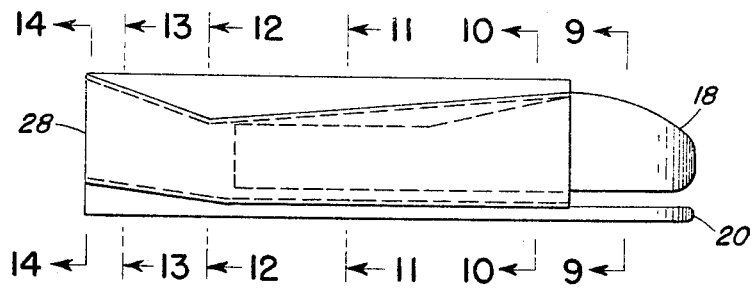
Fig. 8.
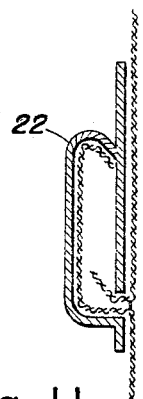
Fig. 11.
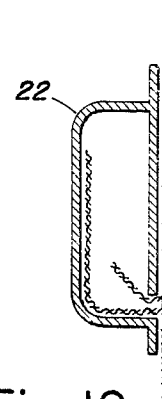
Fig. 10.
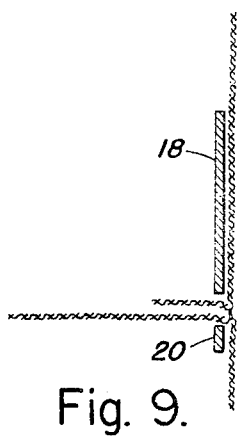
Fig. 9.
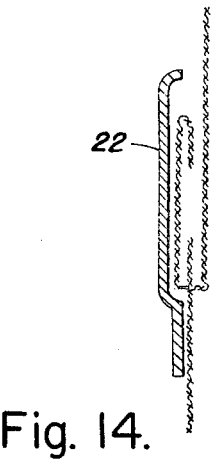
Fig. 14.
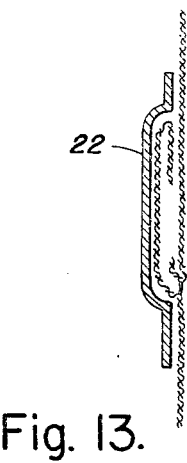
Fig. 13.
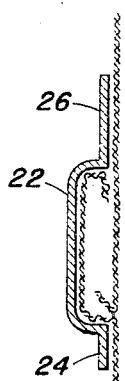
Fig. 12.
*INVENTOR.*
Anthony G. Tucci
BY 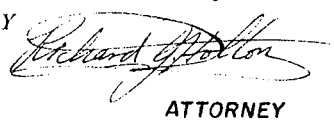
ATTORNEY Oct. 11, 1966    A. G. TUCCI    3,277,853
FABRIC-SHAPING DEVICES
Filed Sept. 24, 1965    3 Sheets-Sheet 3
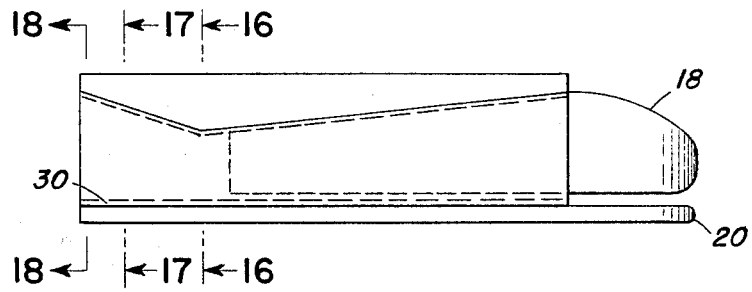
Fig. 15.
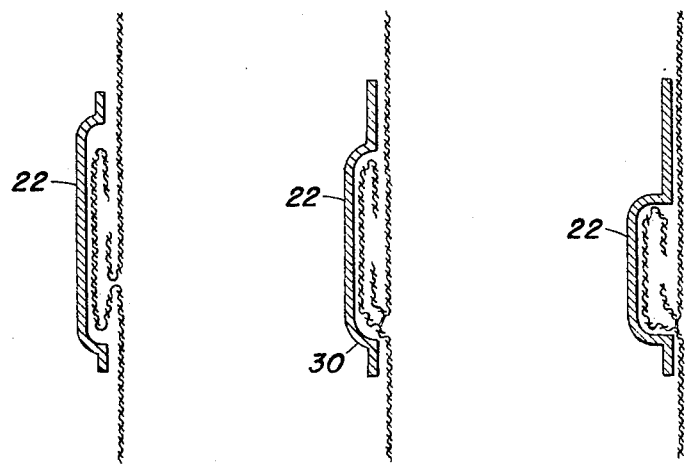
Fig. 18.    Fig. 17.    Fig. 16.
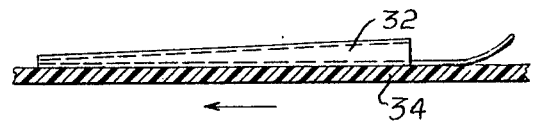
Fig. 19.
INVENTOR.
Anthony G. Tucci
BY 
ATTORNEY

United States Patent Office

3,277,853
Patented Oct. 11, 1966

3,277,853
FABRIC-SHAPING DEVICES
Anthony G. Tucci, 9602 103rd Ave., Ozone Park,
Long Island, N.Y.
Filed Sept. 24, 1965, Ser. No. 489,858
5 Claims. (Cl. 112—147)

This is in part a continuation of my application Serial No. 204,985, filed June 25, 1962.

This invention relates to devices for manipulating and shaping cloth or the like. In particular, this invention relates to devices for use in conjunction with a presser or the like, for the purpose of presenting the material to the presser in a desired configuration, which configuration can be fixed in the fabric by the pressing operation.

Many devices and methods have been proposed for imparting desired predetermined configurations, such as folds, pleats, and the like, to cloth workpieces. In general, such devices have been designed as attachments for sewing machines, and their operation was such that the material was drawn through them just prior to being fed to the sewing machine, which, by means of stitching, rendered permanent or semi-permanent the configuration imparted to the material by the feed attachment. Thus, for example, there have been proposed hemming attachments. One such attachment was in the form of a tapered, horizontal, funnel-like device which, in cross-section, had the configuration of a spiral, instead of the circular cross-section of a true funnel. In operation, the edge of the material was pulled through the device from the large toward the small end, with the main portion of the fabric extending transversely out the open side of the spiral. As the material was drawn through this device, the tapered spiral form of the tool caused the edge of the material to be lifted up and turned back upon itself, and, on emerging from the attachment in such turned-back configuration, was immediately stitched down by the sewing machine to form a permanent hem. Other devices have been proposed for forming pleats in a piece of material as it was fed to a sewing machine, to the end that the pleats would be immediately stitched down and thus made permanent, and for accomplishing other similar operations, all with the general object of imparting a desired configuration to a piece of material and then rendering the configuration permanent or at least semi-permanent. All of these devices suffered from various disadvantages, but common to all of them was the disadvantage that such devices were not self-priming—that is to say they required that the operation be started by manually threading the material through the device. Particularly when the workpiece being operated on is a small item, such manual threading of each successive piece takes a major portion of the operator's time, and completely offsets the gains in efficiency which would otherwise be achieved by the use of the device. When a series of similar workpieces is being operated on, it is sometimes possible to achieve a semblance of continuity by allowing the starting end of each piece to overlap the end of the piece preceding it, and be drawn through the device thereby. This method, however, is wasteful of material, because the overlapping areas must be cut off and discarded, and the waste is proportionately greater when the work pieces being treated are small ones. Moreover, there are many operations which involve the folding of the material and subsequent fixing of the fold by stitching or otherwise, for which no satisfactory device has to date been offered, and which in consequence are still done by completely manual methods.

In particular, no satisfactory device has heretofore been proposed for automatically manipulating and shaping the narrow strips of fabric adjacent the stitch line of a sewn seam, in order to provide a finished appearance to the reverse side of the garment or to prepare the seam for finishing by additional lines of stitching.

It is an object of this invention, therefore, to provide improved apparatus for imparting a desired configuration to a piece of cloth or the like. Another object is to provide apparatus for such purpose, which is self-priming. Another object is to provide apparatus for carrying out folding operations heretofore performed by hand. Another object is to provide improved apparatus for manipulating the narrow strips of fabric adjacent the stitch line of a sewn seam.

A feature of this invention is the provision of a shaping device adapted to be mounted above and closely adjacent to a relatively movable subjacent surface.

Another feature is the provision of at least two foot means adapted to hold portions of a workpiece in frictional engagement with said relatively movable subjacent surface.

Still another feature is the use of foot means as aforesaid, having leading edges adapted to be mounted in spaced relation to said relatively movable subjacent surface.

Another feature still is the use of foot means as aforesaid, which are so disposed as to define between them a slot through which portions of said workpiece may extend generally vertically away from said relatively movable subjacent surface.

Another feature is the provision of shroud means overlying said slot for urging said vertically-extending portions to generally horizontal positions overlying said foot means.

Other objects, features and advantages will become apparent from the following more complete description and claims, and the accompanying drawings.

In one particularly desirable embodiment, this invention contemplates a device for folding two strips of material adjacent a seam in a flexible workpiece, said device being adapted to be mounted above and immediately adjacent a relatively movable subjacent surface, which comprises in combination first foot means for holding a first portion of said workpiece adjacent said seam in frictional engagement with said relatively movable subjacent surface, second foot means for holding a second portion of said workpiece adjacent said seam in frictional engagement with said relatively movable subjacent surface, said first and second foot means having leading edge portions adapted to be mounted in spaced relation to said relatively movable subjacent surface, said first and second foot means cooperating to define a slot open at both ends through which said strips may extend upwardly away from said relatively movable subjacent surface, and shroud means overlying said slot for urging at least one of said strips to a generally horizontal position overlying at least one of said first and second portions of said workpiece.

Referring now to the figures:

FIGURE 8 is a plan view of an embodiment of the invention adapted to fold a "peg-leg" seam into proper configuration to prepare it for a second sewing operation, as practiced in the making of a conventional robe seam, such as is used in bathrobes and the like.

FIGURES 9–14 are a series of cross-sections taken along lines 9—9, etc., of FIGURE 8.

FIGURE 15 is a plan view of an embodiment similar to that of FIGURE 8, but modified to produce a novel type of seam.

FIGURES 16–18 are a series of cross-sections taken along lines 16—16, etc., of FIGURE 15.

FIGURE 19 is a side elevation of a device according to the embodiment of FIGURE 1, showing the operative position of a relatively movable subjacent surface, which in this preferred embodiment is a portion of a belt.

Figure 1:
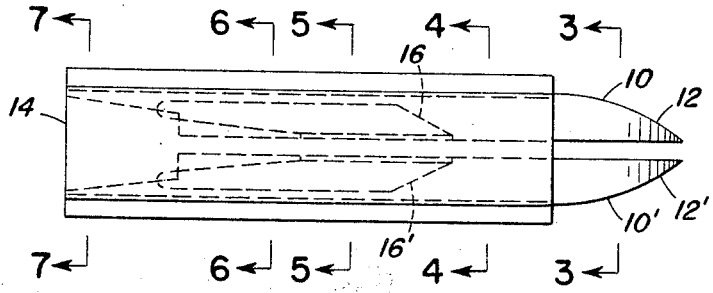
FIGURE 1 is a plan view of one embodiment of the invention, namely a seam-dresser adapted to put a double fold (similar to a hem fold) in each of the two narrow pieces of fabric adjacent a stitched seam.
Figure 2:
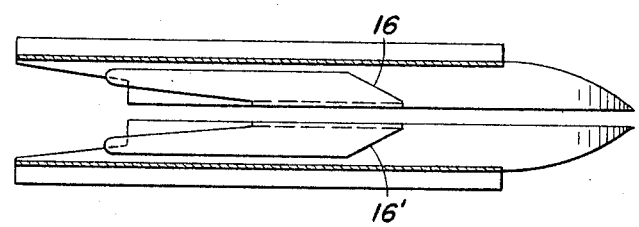
FIGURE 2 is a plan view of the device of FIGURE 1, but with certain parts omitted in order to show others more clearly.
Figure 3:
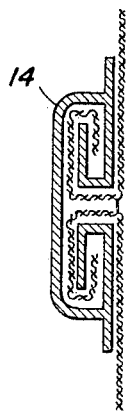
FIGURES 3-7 are a series of cross-sections of the device of FIGURE 1, taken along lines 3—3, etc. of FIGURE 1.
Figure 4:
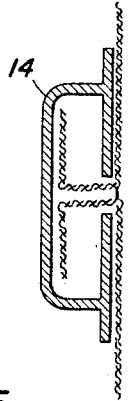
Figure 5:
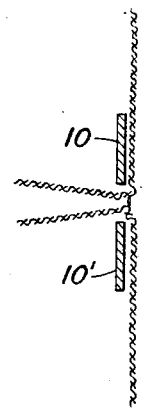
Figure 6:
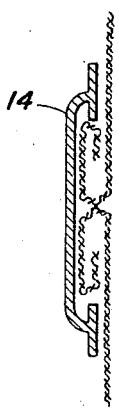

In the various plan views of the several embodiments of the invention, viz FIGS. 1, 2, 8 and 15, the fabric is not shown, for the sake of clarity in showing the structures of the devices themselves. In all of the cross-sectional views, the fabric is shown, to illustrate the manner in which it takes on the desired configuration while passing through the device.

Referring back to the figures, and more particularly to the seam-dresser as shown in FIGURES 1–7, the device of this invention comprises a pair of foot means 10, 10'. Both foot means are adapted to be mounted in position to hold a workpiece in contact with a relatively movable subjacent surface (not shown in these figures), and have leading edge portions 12, 12', adapted to be mounted in spaced relation to the subjacent surface, thus providing a clearance for the workpiece to enter between the foot means and the subjacent surface.

It should be explained at this point that the device of this invention is movable relative to the subjacent surface. The devices of this invention may be employed in connection with a flatiron or the like (as attachments on the iron), in which case the iron and the attachment move, while the fabric and the subjacent surface are stationary. Alternatively, and preferably, these devices may be used as attachments on a belt-driven fabric-processing machine, for example a seam-presser such as is described in my U.S. Patent No. 3,107,447, issued October 22, 1963. In such device, a workpiece is transported by a belt where it is pressed, sewn, or otherwise treated, and is discharged from the machine by continued forward motion of the belt. In many cases, it is desired to impart a particular configuration to the workpiece before it is pressed, sewn or the like. More specifically, the device as illustrated in FIGURES 1–7 is designed to operate on the two narrow strips adjacent a sewn seam in a workpiece, spreading them outwardly and folding the edges under to provide a neat, regular appearance, after which the folded strips may be pressed or sewn down. When such a device is mounted over the belt and in line with the front of the pressing or sewing means, the belt (which in this embodiment is the subjacent surface), engages the workpiece, draws it through the seam-dresser, and then immediately under the pressing or sewing means, so that the folds imparted to the workpiece by the seam-dresser are immediately fixed in the fabric by the pressing or sewing operation.

In the initial sewing of a seam, it is normally necessary for the operator to sew the seam, to the best of his ability, in such a way that the two narrow strips of fabric adjacent the seam are of equal and uniform width. If the operator is unskillful, or the cutting of the pattern has been inaccurate, the two strips will not be of equal and uniform width throughout, and the seam, as viewed from inside the garment, will not have a well-made, attractive appearance. The seam-dresser of FIGS. 1–7 overcomes these problems by automatically measuring a predetermined width of material in each direction perpendicular to the seam, and then turning the remainder under, producing on each side of the stitching a double fold similar to a hem fold.

Figure 7:
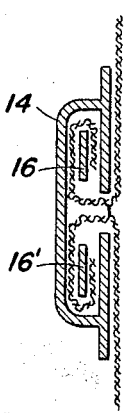

In the operation of the seam-dresser, the seamed workpiece is fed into the shaper in such a way that the line of stitching passes longitudinally into the slot defined by the opposing edges of feet 10 and 10', with the narrow strips of fabric adjacent the seam extending upwardly into the slot. The main portions of the pieces which have been sewn together extend horizontally in opposite directions under the two feet. Fixed operating means in the form of a plough or the like (not shown) may, if desired, be provided for the purpose of opening the seam—that is, of separating the two narrow strips of fabric extending up through the slot. Ordinarily, however, it is simpler and more desirable for the operator to separate the two strips manually, to a sufficient extent so that, when intercepted by a shroud 14 overlying the slot, they will be forced in opposite directions, instead of both going to the right or to the left. Feet 10 and 10' are extended upwardly and then outwardly, forming fingers 16 and 16'. Fingers 16 and 16', together with shroud 14 and the upper surfaces of feet 12 and 12', form a pair of narrow channels, forcing the two strips of fabric to assume the configuration shown in FIGURE 6. As shroud 14 assumes the configuration of a flat tube toward the discharge end of the shaper (FIGURE 6), fingers 16 and 16' terminate, and feet 10 and 10' recede, leaving the dressed seam ready for pressing or stitching down, as shown in FIGURE 7.

The embodiment of the invention shown in FIGURES 8–14 is adapted to produce a seam of the type customarily used in bathrobes and the like. The workpiece is initially sewn in the form of a "peg-leg"—i.e. a seam having a narrow strip of fabric on one side of the seam and a comparatively wide strip on the other. The seamed workpiece is then fed into the device of FIGURE 8 in the manner shown cross-sectionally in FIGURE 9, with both of the aforesaid strips projecting upwardly through the slot defined by the opposed edges of foot 18 and foot 20, while the main portions of the workpiece, which will become the body of the garment, lie under foot 18 and foot 20, extending away horizontally in either direction. As the workpiece proceeds through the device, the wider strip is folded over the narrower one by the shroud 22, as shown in FIGURE 10, and then doubled under itself, as shown in FIGURES 11 and 12. Foot 18 terminates, and its function of holding the work-piece against the subjacent surface is thence-forward fulfilled by the side members 24 and 26. Side member 24 is an integral extension of foot 20, while side member 26 is a similar portion on the opposite side of the device. The left-hand sidewall of shroud 22 terminates in a portion which is directed inwardly toward the center of the device, as indicated at 28. The function of this portion is to urge the top layer of fabric toward the right, so as to produce a conventional robe seam, as shown in FIGURE 14. When the sidewall of the shroud is not thus directed inwardly, a different type of seam is produced, as will presently appear.

Like the other embodiments of the invention, the robe-seam maker of FIGURES 8–14 may be used to feed the workpiece directly to a sewing machine, for example a two-needle sewing machine which sews the seam down with two parallel lines of stitching, one near each side of the seam as it is shown in FIGURE 14. Instead of a conventional two-needle machine, a belt-fed sewing machine, in which the workpiece is transported by a single belt or an array of parallel belts, having sewing heads spaced both transversely and longitudinally of the direction of belt travel may be used. The use of such an arrangement is preferred to that of a conventional two-needle machine, because it avoids the rippled effect commonly produced when a seam is sewn down by a two-needle machine having two needles on the same needle bar. Such a belt-fed sewing machine is described and claimed in my copending application Serial No. 332,443, filed December 23, 1963.

If preferred, the device of FIGURES 8–14 may be used to discharge workpieces into a pressing iron. When this is done, the configuration shown in FIGURE 14 is fixed in the fabric with sufficient permanence to allow the two lines of stitching to be put in separately and successively, using a single-needle machine.

A modification of the device of FIGURES 8–14 is shown in FIGURES 15–18. The device and the operation thereof are similar to those of the device of FIGURES 8–14, except that the sidewall of the shroud is carried straight back as indicated at 30, instead of being directed inwardly toward the center of the device. When the shaper is constructed in this manner, the upper layer of fabric of the seam, when pressed down by the top of the shroud, extends itself partly to the left, producing the configuration shown in FIGURE 18. When the seam as illustrated in FIGURE 18 is stitched, or preferably blind-felled, to fix the two edges of the seam to the main body of the fabric, a seam of unusually handsome appearance and flatness is produced. Garments made with this type of seam throughout may in fact be made reversible even though unlined, in sharp distinction from the usual type of reversible garment which is, in effect, simply two garments assembled together in such fashion that each is a lining for the other, and each conceals the seams of the other.

The relative positions of the shaper of this invention and the relatively movable subjacent surface (in this case a belt) are shown in FIGURE 19. The shaper 32, which is shown as a seam-dresser of the type shown in FIGURE 1, but may be a shaper according to any of the various embodiments of the invention, is mounted above and closely adjacent the belt 34. The leading edge 12 of each foot 10 must be spaced away from the belt by an amount sufficient to allow the workpiece to enter between the foot and the belt. The main extent of the foot must be sufficiently close to the belt so that it will hold the workpiece in frictional engagement with the belt. Normally, the shaper is mounted so that the main portion of the foot is in actual contact with the belt in the absence of a workpiece, relying on the flexibility of the belt, fabric and shaper to provide enough separation to permit workpieces to pass between the belt and the foot.

In the preferred embodiment as shown, the leading edge of the foot is curved upwardly. Alternatively, it may be a straight portion projecting up at a slight angle to the horizontal, or the entire foot may be a single straight piece, but mounted at a slight angle to the horizontal, so that the leading edge is spaced from the belt to provide entrance clearance and the greater portion of the foot is close enough to the belt to provide the necessary pressure on the workpiece.

Comparing the manner in which the various folding operations are automatically and rapidly performed by the several embodiments of the invention just described, with the ways in which similar operations have been carried out in conventional practice, the advantages of this invention become immediately apparent.

In dressing a seam, a number of methods are used, depending on production requirements and/or the price range of the garment. In a typical operation, the edges of the two pieces of fabric are turned, basted, and felled. The felled edges are then pressed, after which the seam is sewn, and then the seam is pressed open.

Using the seam-dresser according to this invention, as shown in FIGS. 1–7, it is necessary only to sew the seam and run it through the seam-dresser, preferably discharging into a presser. If desired, the edges may be felled later, but the basting and preliminary pressing operations are eliminated altogether. Alternatively, the effect of felling may be achieved by gluing the edges down, for example by the use of a heat-sensitive adhesive which is activated by the pressing operation.

In making a robe seam by conventional methods, a number of methods are used. In one method which is commonly employed, the whole seam is fashioned manually by the operator as he feeds the work to a two-needle machine. This method is rapid and inexpensive but undesirable due to the bulkiness of the resulting seam. Also, the fact that the two needles are on the same bar causes a wavy or rippled effect in the seam, such as is frequently noted in a man's shirt seam. Other methods are in use, which employ conventional sewing machines, but require repeated manual folding and critical judgment on the the part of the operator—to the extent that it is customary to use a gauge in some operations, rather than thrust the operator's eye.

Using the robe-seam maker as shown in FIGS. 8–14, these difficulties are avoided, and a neat, uniform and non-bulky robe seam is produced automatically, without any effort on the part of the operator other than to guide the workpiece into the device. The robe-seam maker may be arranged to discharge directly to a sewing machine or to a presser, but in either event, a single line of stitching on a conventional machine suffices to complete the seam, and the quality of the seam does not particularly depend on critical judgment of the operator as to the position of the stitching.

While the invention has been described in terms of certain preferred embodiments and illustrated by way of certain drawings, these are illustrative only, and the invention is not to be construed as limited, except as set forth in the appended claims.

I claim:

1. A device for folding two strips of material adjacent a seam in a flexible workpiece, said device being adapted to be mounted above and immediately adjacent a relatively movable subjacent surface, which comprises in combination first foot means for holding a first portion of said workpiece adjacent said seam in frictional engagement with said relatively movable subjacent surface, second foot means for holding a second portion of said workpiece adjacent said seam in frictional engagement with said relatively movable subjacent surface, said first and second foot means having leading edge portions adapted to be mounted in spaced relation to said relatively movable subjacent surface, said first and second foot means cooperating to define a slot open at both ends through which said strips may extend upwardly away from said relatively movable subjacent surface, and shroud means overlying said slot for urging at least one of said strips to a generally horizontal disposition overlying at least one of said first and second portions of said workpiece.

2. A device for folding the strips of material adjacent to a seam in a flexible workpiece, said device being adapted to be mounted above and immediately adjacent a relatively movable subjacent surface, which comprises in combination a pair of foot means for holding a portion of said workpiece adjacent said seam in frictional engagement with said relatively movable subjacent surface, said foot means having leading edge portions adapted to be mounted in spaced relation to said relatively movable subjacent surface, said foot means having edges cooperating to define a slot, open at both ends, through which narrow strips of material adjacent said seam may extend upwardly away from said relatively movable subjacent surface, shroud means overlying said slot for urging said strips downwardly to a position in which each of said strips overlies the portion of said workpiece under one of said foot means, and a pair of flange means intermediate said foot means and said shroud means for urging the edges of said strips to a position between the remainder of said strips and said portions underlying said feet, said workpiece being drawn through said device by relative movement between said device and said relatively movable subjacent surface in a direction generally parallel with said slot.

3. A device for imparting a robe-seam fold to two strips of material adjacent to a seam in a flexible workpiece, one of said strips being relatively wide and the other relatively narrow, said device being adapted to be mounted above and immediately adjacent to a relatively movable subjacent surface, which comprises in combination foot means for holding a first portion of said workpiece adjacent said seam in frictional engagement with said relatively movable subjacent surface, guide means for holding a second portion of said workpiece in frictional engagement with said relatively movable subjacent surface, said foot means and said guide means having leading edge portions adapted to be mounted in spaced relation to said relatively movable subjacent surface, said foot means and said guide means cooperating to define a slot open at both ends through which said strips may extend upwardly away from said relatively movable subjacent surface, said narrow strip being on the side of said slot nearest said foot, shroud means overlying said slot for urging said wide strip to a position overlying said narrow strip and said first portion, said shroud means being shaped to turn the edge of said wide strip under to a position between said first portion and the remainder of said wide strip, said guide means extending beyond said foot means, the extension of said guide means beyond said foot means being slanted inwardly, thereby preventing any portion of said wide strip from extending substantially beyond said seam.

4. A device for imparting an improved seam fold to two strips of material adjacent a seam in a flexible workpiece, one of said strips being relatively wide and the other relatively narrow, said device being adapted to be mounted above and immediately adjacent to a relatively movable subjacent surface, which comprises in combination foot means for holding a first portion of said workpiece adjacent said seam in frictional engagement with said relatively movable subjacent surface, guide means for holding a second portion of said workpiece in frictional engagement with said relatively movable subjacent surface, said foot means and said guide means having leading edge portions adapted to be mounted in spaced relation to said relatively movable subjacent surface, said foot means and said guide means cooperating to define a slot open at both ends through which said strips may extend upwardly away from said relatively movable subjacent surface, said narrow strip being on the side of said slot nearest said foot, shroud means overlying said slot for urging said wide strip to a position overlying said narrow strip and said first portion, said shroud means being shaped to turn the edge of said wide strip under to a position between said first portion and the remainder of said wide strip, said shroud means being diminished in height toward the discharge end of said device, whereby an appreciable portion of said wide strip is deformed to extend over said seam.

5. A device for folding two strips of material adjacent a seam in a flexible workpiece, one of said strips being relatively wide and the other relatively narrow, said device being adapted to be mounted above and immediately adjacent a relatively movable subjacent surface, which comprises in combination foot means for holding a first portion of said workpiece adjacent said seam in frictional engagement with said relatively movable subjacent surface, guide means for holding a second portion of said workpiece adjacent said seam in frictional engagement with said relatively movable subjacent surface, said foot means and said guide means having leading edge portions adapted to be mounted in spaced relation to said relatively movble subjacent surface, said foot means and said guide means cooperating to define a slot open at both ends through which said strips may extend upwardly away from said relatively movable subjacent surface, said narrow strip being on the side of said slot nearest said foot, shroud means overlying said slot for urging said wide strip to a position overlying said narrow strip and said first portion, said shroud means being shaped to turn the edge of said wide strip under to a position between said first portion and the remainder of said wide strip, said workpiece being drawn through said device by relative movement between said device and said subjacent surface in a direction generally parallel with said slot.

References Cited by the Examiner
UNITED STATES PATENTS

| | | | |
|---|---|---|---|
| 529,419 | 11/1894 | Schoen | 112—141 |
| 623,891 | 4/1899 | Diehl et al. | 112—143 |
| 1,489,217 | 4/1924 | Jones | 112—147 |
| 2,972,317 | 2/1961 | Ashe | 112—147 |
| 2,972,318 | 2/1961 | Schindler | 112—147 |
| 3,182,885 | 7/1965 | Timm | 112—143 X |

JORDAN FRANKLIN, *Primary Examiner.*

H. H. HUNTER *Assistant Examiner.*